United States Patent Office 3,544,236
Patented Dec. 1, 1970

3,544,236
FLUID FLOW CONTROL
James L. Brookmire, 3310 Hastings Road,
Erie, Pa. 16506
Filed Mar. 17, 1969, Ser. No. 807,890
Int. Cl. F04b *49/00;* G05b *5/00*
U.S. Cl. 417—32                                8 Claims

ABSTRACT OF THE DISCLOSURE

This specification discloses a control that utilizes superheated sensors which give an electrical output from a change of flow rate of a liquid or gas medium in which the sensor is located. The change of flow rate changes the temperature of the sensor and results in a change of its electrical output. The superheated sensor may be an NTC type, such as a thermistor, or a PTC type, such as a nickel wire, platinum wire sensor, or other suitable sensor. The super heating of the sensor is achieved by wrapping the sensor with an electrical heating element which elevates the body temperature of the sensor to several hundred degrees above normal room temperatures. Any change of the body temperature of the superheated sensor due to variations of ambient temperatures is an unwanted variable and is cancelled out by another sensor such that the only variable that is utilized for control purposes is the change in body temperature of the superheated sensor due to rate of change of the flow of the medium. The superheated sensor's electrical output is amplified and utilized to change the speed of a fan motor, control the closure or opening of a valve, control a compressor motor, or any mechanism which can be utilized to change the flow rate and flow of the medium. Closed loop feedback techniques are utilized to enable good control with accurate results.

STATEMENT OF INVENTION

This invention relates to flow controls and, more particularly, to the control of flow of liquids and gases by means of a superheated sensor.

PRIOR ART

Previously, there has been no application in the flow control field that utilizes applicant's approach to control the flow (cubic feet per minute (c.f.m.)), of air or gases and liquids. This method of control has been proven beyond all doubt for the air medium and should also be directly applicable for control of the flow of many types of gases and liquids through large temperature ranges of operation and a large range of flow rates. This technique is not beyond cryogenic temperature ranges.

OBJECTS OF THE INVENTION

It is an object of the invention to provide an improved method of controlling flow of a liquid or gas.

Another object of the invention is to provide an improved circuit for controlling the flow of a liquid or gas.

DESCRIPTION OF THE DRAWING

The figure shows a schematic diagram of the flow control according to the invention.

DETAILED DESCRIPTION OF THE DRAWING

Figure 1:
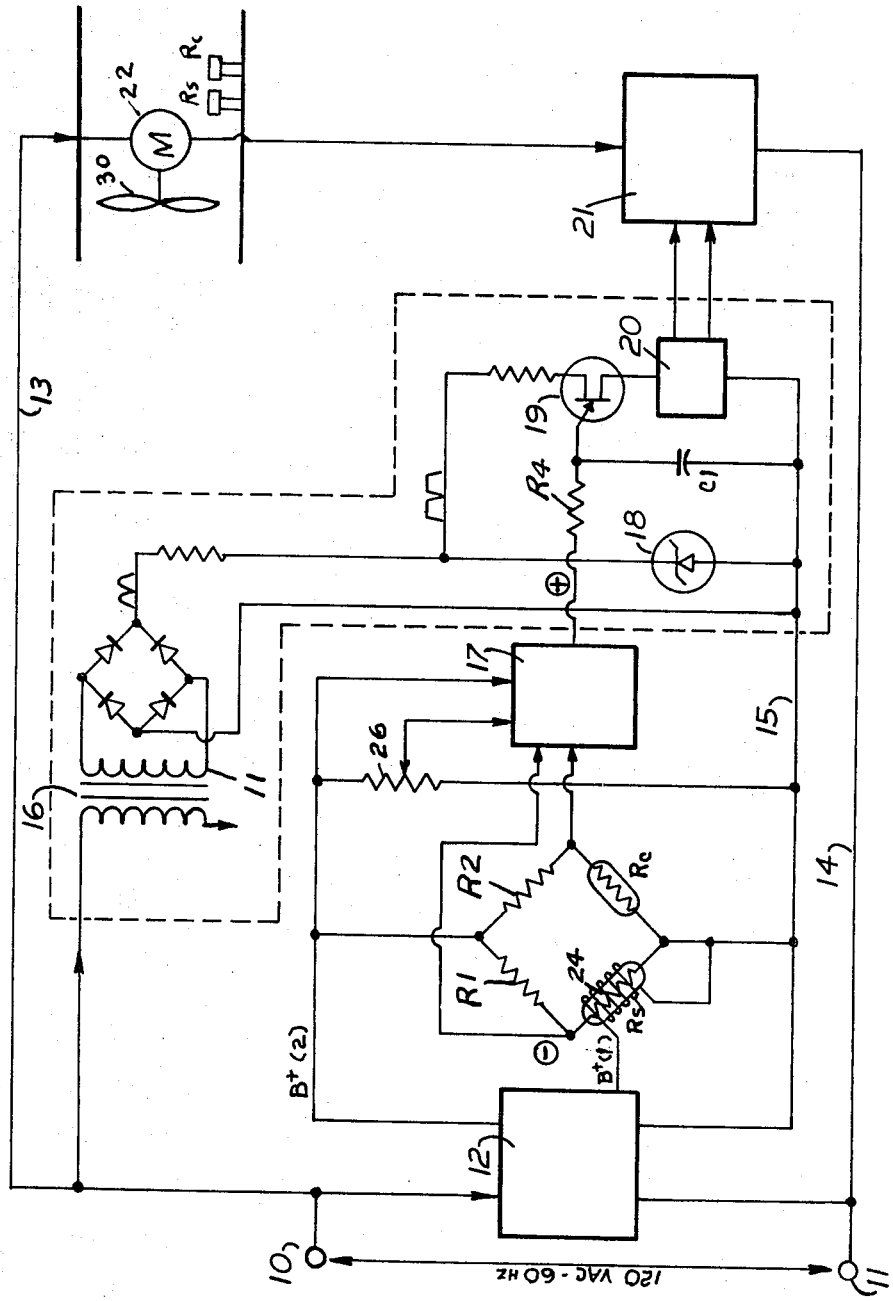

Now with more particular reference to the drawing, a sensing element such as, for example, an NTC thermistor, PTC sensor (nickel wire, platinum wire) that will produce an electrical output from a change of temperature, may be used. The NTC thermistor, R sensor or simply $Rs$, usually has a high coefficient but since it does not represent a heat source, applicant wraps $Rs$ with a heater element and bonds the same element to the NTC thermistor such that $Rs$ is now considered a heater-thermistor assembly. The heater wire of $Rs$ is connected to a regulated power supply such that the heater power remains constant at some elevated high temperature several hundred degrees above the highest ambient temperature expected. This now makes $Rs$ a heat source when power is applied. Then a gas, such as air, is passed by $Rs$ at a rate to keep $Rs$ at a safe operating point so that it does not overheat and destruct itself. Other variables are as noted below. Considering the temperature of ambient air flow ($Ta$) and the flow of the medium ($Fr$), the problem applicant desires to solve is to keep $Fr$ constant for all variables that exist that cause flow errors in the mediums of gases and liquids. In a particular example, in an air flow controller, the concern was with keeping the flow of air constant that passed through an air filter. The purpose of the filter was to collect dust particulate that is contained in the air for analysis purposes for air pollution applications. Thus the major variables that effect flow are: (1) clogging of the flow stream which decreases the flow; (2) temperature of the flow stream; (3) line voltage variations that change the instrumentation or equipment that produces the flow; and (4) turbulence of the flow stream which may be caused by many factors. There was also concern with the first three enumerated variables with the flow controller. In this project, applicant was primarily concerned with keeping the flow of air *constant* to a value of 40 c.f.m. in a standard high volume air sampler used in the air pollution field for collection of dust particles in the air. The collected particulate was captured by an intake filter and the air flow was produced and controlled by an A.C. universal induction fan motor. However, let it be stressed that this technique can be utilized to detect flows of many gases and liquids throughout wide variations of temperature and flow rates. It should also be stressed that flow producer might be any device such as a pump, compressor, motor, hydraulic unit, for example, and that the controlling mechanism that regulates the flow might be an adjustable valve, variation of motor speed, variation of pump pressure, for example.

DETAILED THEORY OF OPERATION

For any set flow rate, where the system has been adjusted and stabilized, a small change in flow, $\Delta Fr$, will effect the degree of heating or cooling of $Rs$. If the flow should decrease due to external effects mentioned previously, such as filter clogging, ambient temperature, or line voltage, $Rs$ will increase its body temperature and give in this illustration an error signal in the form of decreased resistance of the NTC thermistor of $Rs$ assembly. This form of resistance change produces an error in the bridge voltage that $Rs$ is electrically connected to. This error voltage is amplified by electronic amplifiers and is also power amplified and applied to the fan motor through closed loop feedback techniques. This amplified error voltage increases the speed of the fan motor just enough to bring the amount of cooling of $Rs$ back to its original set value of 40 c.f.m. The reverse condition also occurs if the air flow across $Rs$ should increase due to increase of line voltage.

Applicant also noted that the change of $Ta$, $\Delta Ta$, will also cause changes in $Rs$ and in the resultant air flow. Therefore, applicant introduces a second NTC thermistor which he defines as $Rc$ and electrically connects $Rc$ into the bridge circuit in such a manner that $Rc$ cancels the effects of temperature variations applied to $Rs$. If these sensors are matched properly, $Rs$ will detect changes of flow due only to heat transfer from the body of $Rs$ to its surrounding air stream. If the electronic circuitry is adjusted for a specific flow, then any change of flow will cause a greater or lesser heat transfer from the body of Rs to its surrounding air stream and the factor of temperature Ta and ΔTa is cancelled out by Rc since ΔTa is an unwanted variable for the application. This is true since it is desired that the flow be constant for all considered ambient temperatures. The invention provides capability of holding the air flow to a constant value of 40 c.f.m., plus or minus 2½ %, for 24 hour temperature variations throughout range of 10 to 120 degrees F., for severe conditions of filter clogging, and for line voltage variations of 95 v. A.C. through 140 v. A.C., 60 Hz.

The reason for elevating the temperature of Rs, several hundred degrees above Ta is two fold. By doing so, it enables the sensitivity of Rs to be greater for a given amount of change in the flow (Fr). The heat transfer from Rs to the surrounding air stream is a greater amount since the temperature of Rs is much higher than Ta. The second reason for the elevation of Rs is to reduce the error contribution of ΔTa since it is an unwanted variable. If Ta should change radically, the ΔTa is not detected as much by Rs if Rs is much hotter than Ta. If Rs was only 100 degrees hotter than Ta, its sensitivity to changes in Ta would be much greater than if Rs was 200 degrees hotter than Ta. Thus the percentage effect of the unwanted variable ΔTa is reduced and it is easier to swamp out the temperature variations by Rc in the bridge circuit.

Both Rc and Rs are mounted in the intake gas stream or liquid stream whatever the case and are mounted in such a manner that the heat from Rs does not affect Rc and that heat loss from the wires of Rs is negligible.

Since Rc is not a heat source, its task is to detect variations of Ta only, and by proper matching with the NTC thermistor of Rs assembly, applicant obtains bridge outputs only for variations of flow due to heat transfer from Rs to its medium. Assuming zero drift in the regulated power supply and the electronics, line voltage changes to the motor will cause a change in motor speed and Rs will detect this speed change by a resulting air flow change. This also causes an error signal due to a change of heat transfer which adjusts the motor speed by changing the motor voltage in such a magnitude to bring the flow back to its original preset value. This is done in the illustrated block diagram by standard electronics which comprise a small closed loop system which operates as follows:

For a desired flow, the circuit is adjusted by the "rate adjust" 26 so that a small steady state voltage exists and this voltage is amplified such that it is large enough in power to drive, in this case, an A.C. fan motor at the desired speed. This is called the "reference setting" or desired flow setting. Now if an external variable such as filter clogging should cause an error in heat transfer to exist on Rs, the Δ signal is immediately sensed by a resistance change in Rs and an additional voltage offset in the preset bridge voltage. This Δ voltage is amplified by the D.C. differential amplifiers so that a positive polarity offset voltage is applied to charging capacitor $C_1$. This capacitor charges to the firing voltage level of the UJT transistor and $C_1$ discharges through emitter of UJT and a pulse is formed which fires the appropriate SCR at the proper timing sequence dictated by the D.C. level at the output of the differential amplifier. A Zener diode 18 clipped sinusoid is applied to $B_2$ of UJT which synchronizes the UJT to the line frequency so that the firing of the UJT occurs during each half cycle of the line frequency producing standard phase control of the line power which is applied to the fan motor or other control devices. Thus the power delivered to the fan motor is directly proportional to the Δ error voltage of the bridge circuit or to the Δ flow rate of the medium. These SCR's deliver the change in motor power required to increase the motor speed. The resulting effect is that the air flow is changed by the fan motor back to its original value with the motor running at a greater speed to overcome the effect of filter clogging. There is a slight closed loop error which is negligible and is called the "closed loop servo error." Since the electronics produces a very high voltage gain, the servo error is quite small and is completely negligible. The closed loop is from Rs to the bridge circuit, to the amplifiers, to the SCR firing circuit, to the power amplifier, to the fan motor, to the air stream and back to Rs. This is a single high gain loop and must be stabilized to prevent oscillation in the loop which is standard practice. However, the majority of the control is pure solid state and the only mechanical device is the motor resulting in high reliability.

In the drawing, the regulated power supply 12 is supplied power from the A.C. voltage power source connected to lines 10 and 11 which supply power through lines 13 and 14 through the power amplifier 21 and to the motor 22. The motor 22 may be connected to a fan 30 in the duct 31. The motor could be connected to a damper, pump or other impeller or the like to control the flow in the duct. A regulated D.C. power supply with isolation transformer is indicated at 12 which supplies power to the heater Rs which is wrapped with a heater element and bonded to the NTC thermistor indicated at 24 such that Rs is considered to be a heater-thermistor assembly. The element 24 may be an NTC thermistor, a PTC sensor (nickel wire, platinum, or other suitable device). The heater-thermistor assembly is connected in bridge circuit with a second NTC thermistor Rc which are connected in the bridge circuit with $R_1$ and $R_2$ which are resistors of a suitable value Rc and Rs are disposed in the fluid flow line in the ducts 31. The output of the bridge circuit is connected to the D.C. differential amplifier and loop stabilization network 17 which is connected through resistor $R_4$ to the UJT transistor 19. The transistor 19 is connected to the pulse transformer 20 and the output of the pulse transformer 20 is connected to the SCR phase control power amplifier 21 which contains the inverse parallel SCR's. It will be noted that Rs and Rc are both physically located in the flow stream of the medium in duct 31 as indicated at Rs' and Rc'. Also, it will be noted that differential amplifiers are connected in polarity such that negative output of the left side of the bridge circuit gives positive output from the differential amplifier.

Examples of sensors that have been used successfully in this invention are:

NTC thermistor
PTC wire wound type sensor such as nickel or platinum.

The embodiments of the invention in which an exclusive property or privilege is claimed are defined as follows:

1. A flow control for fluid in a duct comprising a motor adapted to be connected to means to change the flow in said duct,
   control means to control electrical energy to said motor,
   said control means comprising a sensor disposed in said contact with said fluid in said duct,
   said sensor having the property that its resistance changes in direct proportion or in inverse proportion to its temperature,
   said sensor being connected to a regulated power supply whereby said assembly is heated to a temperature above the highest anticipated temperature of said fluid,
   and amplifying means connecting said sensor assembly to said motor whereby the rotation of said motor is changed by a change in the rate of flow of said fluid in said duct.

2. The flow control recited in claim 1 wherein said sensor assembly is connected as a leg of a bridge circuit and said bridge circuit is connected by means of an amplifying circuit to said motor.

3. The circuit recited in claim 1 wherein said motor is operably connected to a fan whereby said fluid is circulated in said duct.

4. The motor recited in claim 3 wherein said sensor assembly comprises a sensor wrapped in a heater element, said heater element being connected to a regulated power supply whereby said heater power remains constant over a range of operating temperatures of said device.

5. A flow control for fluid comprising a motor adapted to be connected to a fan in a duct,
a heat sensor unit,
a heater in engagement with said sensor unit,
a regulated power supply connected to said heater,
said sensor unit being adapted to be disposed in fluid flow engagement with said fluid,
said sensor being disposed in a circuit,
said circuit being connected to said motor by means of an amplifier whereby the said motor is driven at a different rate of speed when said flow changes.

6. The control recited in claim 5 wherein said circuit is connected to said amplifier by means of a unijunction transistor circuit including a pulse transformer, Zener diode, and a differential amplifier.

7. The flow control recited in claim 6 wherein said amplifier is a power thyristor phase controlled amplifier.

8. The control recited in claim 2 wherein a second sensor is connected in said bridge circuit and disposed in said fluid flow duct.

References Cited
UNITED STATES PATENTS

| | | | |
|---|---|---|---|
| 3,408,940 | 11/1968 | McGrogan | 103—25 |
| 3,367,124 | 2/1968 | Beck | 103—25 |
| 3,334,285 | 8/1967 | Blake | 417—45 |
| 3,290,576 | 12/1966 | Jensen et al. | 103—25 |
| 2,922,570 | 1/1960 | Allen | 417—32 |
| 2,811,019 | 10/1957 | Courtney | 417—32 |
| 2,424,344 | 7/1947 | Veinott | 417—32 |

HENRY F. RADUAZO, Primary Examiner

U.S. Cl. X.R.
318—471; 417—45